a Belgian company
United States Patent Office 3,311,446
Patented Mar. 28, 1967

3,311,446
PROCESS FOR PRODUCTION OF
SODIUM PERBORATE
Willy Kegelart, Brussels, Belgium, assignor to Solvay &
Cie, Brussels, Belgium, a Belgian company
No Drawing. Filed July 9, 1963, Ser. No. 293,885
Claims priority, application France, July 16, 1962,
904,094
2 Claims. (Cl. 23—60)

The present invention relates to an improvement in the process of manufacturing sodium perborate forming the subject of U.S. Patent No. 3,131,995.

In this application, there is claimed a stabilised solid sodium perborate in the form of small porous spheres with rough or smooth surfaces; it is distinguished from products hitherto known by a large mobility in the dry state, by an apparent density between 0.25 and 0.50 kilograms per $dm.^3$ and by a controllable particle size distribution of relatively small range.

The process of preparing this sodium perborate consists in contacting a solution of sodium metaborate with a solution of hydrogen peroxide in the presence of at least one of the constituents of the stabilizer, the reaction medium being continuously agitated, without turbulence, and precipitating the perborate at a temperature between 0 and 15° C. from a solution in which the relative supersaturation of the perborate, expressed by the ratio between the weight of perborate virtually present in the solution and the weight of perborate normally soluble in water at 20° C., is between 4 and 12.

In U.S. Patent No. 3,109,706 there is claimed a process for significantly improving the rate of dissolution in water of the perborate obtained according to U.S. Patent No. 3,131,995, without reducing the other interesting characteristics, especially the crystalline property, by operating in the presence of a wetting agent and by introducing the second constituent of the stabiliser in the course of or after the precipitation of the sodium perborate.

The perborates obtained according to these processes are present, after precipitation and filtration, in the form of a damp product which is often fragile, difficult to handle and unsuitable for ready feeding to a drier, in particular a fluidized bed drier.

The applicants have found that it is possible to improve, in a remarkable manner, the solidity and mobility of the damp product, which avoids the disadvantages mentioned above and in no way alters the characteristics of the final product.

The improved process forming the subject of the present invention consists in manufacturing perborate of large mobility and with a specific weight between 0.25 and 0.50 kg./$dm.^3$, by the action of sodium metaborate on hydrogen peroxide, in the presence of a stabiliser, as provided in the U.S. Patent No. 3,131,995 to mix the humid product which contains, besides water of crystallization, 40 to 60% of mother liquor obtained after precipitation and separation, with 40 to 150% and preferably 45 to 100% by weight of dry perborate, homogenizing the mixture and then drying it in known manner, for example, in a fluidized bed drier.

The quantity of dry perborate to be added depends on the structure of the precipitated granules and on their content of mother liquor. By adding the dry product in such a manner that the content of mother liquor does not appreciably exceed 30% in the final product, a manipulable product is generally obtained.

In order to obtain a homogeneous mixture, the duration of mixing of the damp perborate with the dry perborate is less than 10 minutes in the most favorable cases but generally does not exceed an hour in the most unfavorable cases.

Whatever the structure of the damp product, neither the relative amounts of the constituents of the mixture nor the duration of mixing affect in any way the particle size distribution of the perborate obtained.

All the damp homogenized mixtures obtained according to the present invention pass a sieve with 2 mm. apertures with a mean rejection rate of 0.5 to 5%, whereas the rejection rate is 100% for the original damp product. The apparent specific weight of the dried perborate remains below 0.50 and, more particularly, between 0.25 and 0.45.

Behaving exactly as dry products, the humid treated mixtures can be sieved, transported on a vibrating conveyor, handled in a hopper and dried in a fluidized bed drier. Moreover, against all expectations, the particle size distribution of the product is not affected by the mixing, in particular the content of fines does not increase.

The homogenisation can be carried out in any mixer suitable for the treatment of granulated products.

The process is of particular interest when applied to the treatment of a damp product before drying in a fluidized bed drier.

The invention is explained in detail by reference to the following examples which are given for the purpose of illustrating the invention and without limiting the same.

Example 1

Sodium perborate is prepared according to the process described in the U.S. Patent No. 3,131,995. 1145 grams of a solution containing 185 grams per kilogram of sodium metaborate and 10.1 grams of a solution of sodium silicate (36° Bé.) are introduced, within a period of 15 minutes, while stirring by means of an "ancre" stirrer rotating at 95 r.p.m., into 984 grams of a solution containing 100 grams per kilogram of hydrogen peroxide and 3.31 grams per kilogram of $MgCl_2.6H_2O$. The rate of introduction of the reactants is such that the temperature of the cooled medium does not rise above 10° C. The reaction medium is then cooled to 5° C. The precipitated perborate is separated from the mother liquors. The damp product contains, besides water of crystallisation, 55% by weight of mother liquors. It is present in the form of relatively solid granules, the tendency to agglomerate of which is not excessive. However, this moist product does not pass through a sieve with 2 mm. apertures, as is shown in Table I. The particle size distribution of the product is not homogeneous. In Table I, columns 3 and 4, the particle redistributions obtained are shown for two samples taken from different parts of the same moist product. These appreciably different redistributions, show that degree of agglomeration of the granules varies with the samples of the same product.

From these particle size redistributions and that corresponding to dry perborate (column 2) mixed with the same quantity of moist product, there has been calculated the redistribution of particle size of the mixture. The result of these calculations is shown in the fifth and sixth columns of Table I.

The moist product mixed with 100% by weight of dry product is mixed in a suitable mixer for granular products and samples are taken at various times for the determination of the particle size distribution and the degree of agglomeration. It is found (Table I, column 12) that after 8 minutes of mixing the rejection rate on a sieve with 2 mm. apertures, has fallen to 1%, characterizing a product which is easily manipulable and which does not agglomerate, while the particle size distribution of the perborate used has not been affected in an appreciable manner by the mixing operation.

TABLE I

| (1) | Sodium perborate used | | Theoretical mixture (calculated) | | Mixture after— | | | | | |
|---|---|---|---|---|---|---|---|---|---|---|
| | Dry | Moist | | | ½ min. | 1 min. | 2 min. | 3 min. | 5 min. | 8 min. |
| | (2) | (3) (4) | (5) | (6) | (7) | (8) | (9) | (10) | (11) | (12) |
| Particle size in percent (after drying in acetone): | | | | | | | | | | |
| >1 mm | 4 | 8  17 | 5 | 8 | 8 | 15 | 4 | 3 | 5 | 5 |
| 1.0–0.250 mm | 69 | 68  68 | 69 | 69 | 71 | 72 | 69 | 67 | 71 | 72 |
| <0.250 mm | 27 | 24  15 | 26 | 23 | 21 | 13 | 27 | 30 | 24 | 23 |
| Rejected by 2 mm. sieve from moist mixture, percent | | 100  100 | | | 7.1 | 3.3 | 1.8 | 1.5 | 1.3 | 1.0 |

Example 2

Operating all the time according to the process of U.S. Patent No. 3,131,995 but under conditions which lead to the obtaining of a perborate which has the appearance of a very moist paste; the grains are fragile and show a strong tendency to agglomerate. Apart from water of crystallization, this perborate contains 55% of water. This moist product is mixed in equal parts with a finished dry product and it is found, as in the first example, that a clear decrease of the rejection rate on the 2 mm. sieve is obtained. However, a longer period of mixing is necessary to obtain the same result. A rejection of 1% is obtained after a mixing time of 30 to 40 minutes, while the particle size distribution remains substantially the same (Table II).

is 45% by weight. The results obtained are shown in Table III. The rejection rate on a 2 mm. sieve of all the humid product treated is of the order of 0.5% after homogenisation for 5 minutes. It is to be noted, however, that the mixture treated with 43 parts of dry product per 100 parts of moist product, shows a slight increase of the rejection rate on the 2 mm. sieve if the homogenisation period is prolonged. This treated product is still acceptable but there is no particular interest in going below the limit of 40 parts of dry product for 100 parts of moist product. The period of treatment does not affect, in an appreciable manner, the particle size of the sodium perborate used. Furthermore, the apparent specific weight of the perborate does not vary appreciably with the treatment and its value remains of the same order.

TABLE II

| (1) | Sodium perborate used | | Theoretical mixture (calculated) | | Mixture after— | | | | | | |
|---|---|---|---|---|---|---|---|---|---|---|---|
| | Dry | Moist | | | 2 min. | 4½ min. | 7 min. | 10 min. | 20 min. | 30 min. | 40 min. |
| | (2) | (3) (4) | (5) | (6) | (7) | (8) | (9) | (10) | (11) | (12) | (13) |
| Particle size in percent (after drying in acetone): | | | | | | | | | | | |
| >1 mm | 7 | 22  29 | 12 | 14 | 7 | 6 | 9 | 6 | 7 | 11 | 6 |
| 1.0–0.250 mm | 74 | 41  51 | 64 | 67 | 64 | 60 | 62 | 66 | 68 | 68 | 65 |
| <0.250 mm | 19 | 37  20 | 24 | 19 | 29 | 34 | 29 | 28 | 25 | 21 | 29 |
| Rejected by 2 mm. sieve from moist mixture, percent | | 100  100 | | | 16.4 | 9.5 | 6.9 | 5.5 | 2.3 | 3.1 | 0.7 |

TABLE III

| (1) | Sodium perborate used | | Mixture after— | | | | | | | | | | | | | | | |
|---|---|---|---|---|---|---|---|---|---|---|---|---|---|---|---|---|---|---|
| | | | 100 p. moist-100 p. dry | | | | 100 p. moist-67 p. dry | | | | 100 p. moist-54 p. dry | | | | 100 p. moist-43 p. dry | | | |
| | Dry | Moist | Calculated | 1 min. | 5 min. | 10 min. | Calculated | 1 min. | 5 min. | 12 min. | Calculated | 1 min. | 5 min. | 10 min. | Calculated | 1 min. | 3 min. | 5 min. |
| | (2) | (3) | (4) | (5) | (6) | (7) | (8) | (9) | (10) | (11) | (12) | (13) | (14) | (15) | (16) | (17) | (18) | (19) |
| Particle size in percent (after drying in acetone): | | | | | | | | | | | | | | | | | | |
| 1 mm | 11 | 0 | 7 | 6 | 5 | 5 | 6 | 5 | 4 | 5 | 7 | 4 | 5 | 5 | 5 | 5 | 5 | 5 |
| 1.0–0.250 mm | 74 | 70 | 73 | 75 | 71 | 71 | 72 | 72 | 70 | 74 | 72 | 73 | 72 | 78 | 72 | 76 | 77 | 83 |
| 0.250 mm | 15 | 30 | 20 | 19 | 24 | 24 | 22 | 23 | 26 | 21 | 21 | 23 | 23 | 17 | 23 | 19 | 18 | 12 |
| Rejected by 2 mm. sieve from moist mixture, percent | | 100 | | 0.5 | 0.5 | 0.2 | | 0.4 | 0.3 | 0.3 | | 0.7 | 0.2 | 0.4 | | 0.4 | 0.2 | 1.8 |
| Apparent specific weight after drying in acetone, in Kgr./dm.³ | 0.37 | 0.33 | | 0.39 | 0.41 | 0.42 | | 0.39 | 0.40 | 0.43 | | 0.36 | 0.40 | 0.43 | | 0.38 | 0.40 | 0.42 |

Example 3

The procedure of Example 1 is followed except that 43 to 100 parts of dry perborate are added for every 100 parts of moist product, the water content of which

Example 4

A moist perborate which contains besides water of crystallization, 45% by weight of water, is introduced into a fluidized bed drier. The perborate granules agglomerate and the drier must be stopped very quickly, the mass being no longer capable of fluidization.

100 parts of dried perborate are added for each 100 parts of moist perborate and this mixture is dried in the fluidized bed. The drier operates very well, without any jamming due to agglomeration of the grains. The results shown in Table IV demonstrate that a drier of this type does not affect the particle size of the product used.

TABLE IV

| (1) | Sodium perborate used | | Mixture used | | Dry sodium perborate leaving the fluid bed drier |
|---|---|---|---|---|---|
| | Dry (2) | Moist (3) | Calculated (4) | Obtained after 2 mins. (5) | (6) |
| Particle size in percent (after drying in acetone): | | | | | |
| >1 mm | 4 | 0 | 3 | 2 | 1 |
| 1.0–0.250 mm | 70 | 70 | 70 | 65 | 66 |
| <0.250 mm | 26 | 30 | 27 | 33 | 33 |

I claim:

1. In a process for the manufacture of sodium perborate stabilized by an alkaline earth metal silicate, which comprises the steps of contacting a sodium metaborate solution with a hydrogen peroxide solution in the presence of at least one constituent of the stabilizer at room temperature to produce a supersaturated solution in which the relative supersaturation in perborate, expressed by the ratio between the weight of the sodium perborate actually present and the weight of sodium perborate which would normally be soluble in water at 20° C., is between 4 and 12, stirring the reaction medium continuously but not roughly, cooling the reaction medium to a temperature between 0° C. and 12° C. within a short time not exceeding one hour thereby to crystallize the sodium perborate, separating the crystallized sodium perborate from the mother liquor and drying it, the improvement which consists in mixing the damp crystallized sodium perborate obtained by separation from the reaction medium and which contains, besides water of crystallization, 40 to 60% by weight of mother liquor, with 40 to 150% by weight of dry sodium perborate, and drying the resulting mixture in a fluidized bed drier.

2. A method according to claim 1, in which the proportion by weight of the dry sodium perborate mixed with the damp sodium perborate is 45 to 100%.

References Cited by the Examiner

UNITED STATES PATENTS 3,109,706  11/1963  Leblon et al. _____ 23—60
3,131,995  5/1964  Gonze et al. _____ 23—60

FOREIGN PATENTS 582,055  11/1946  Great Britain.

OSCAR R. VERTIZ, *Primary Examiner.*

H. T. CARTER, *Assistant Examiner.*